United States Patent Office 3,547,959
Patented Dec. 15, 1970

3,547,959
NOVEL Δ⁴,⁹-PREGNADIENE
Robert Joly, Montmorency, Julien Warnant, Neuilly-sur-Seine, and André Farcilli, Rosny-sous-Bois, France, assignors to Roussel-UCLAF, Paris, France, a corporation of France
No Drawing. Continuation-in-part of applications Ser. No. 517,061, Dec. 28, 1965, and Ser. No. 603,458, Dec. 21, 1966. This application Jan. 31, 1969, Ser. No. 795,703
Claims priority, application France, Dec. 27, 1965, 43,815
Int. Cl. C07c *169/34*
U.S. Cl. 260—397.3    2 Claims

ABSTRACT OF THE DISCLOSURE

17α - methyl-19-nor-$\Delta^{4,9}$-pregnadiene-3,20-dione of the formula

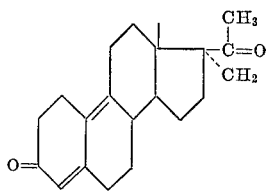

I useful for increasing corpus luteum secretion.

PRIOR APPLICATIONS

The present application is a continuation-in-part application of U.S. patent applications Ser. No. 517,061 filed Dec. 28, 1965 now U.S. Pat. No. 3,453,267 and Ser. No. 603,458 filed Dec. 21, 1966.

OBJECTS OF THE INVENTION

It is an object of the invention to provide the novel steroid, 17α-methyl-19-nor-$\Delta^{4,9}$-pregnadiene-3,20-dione.

It is another object of the invention to provide novel therapeutic compositions.

It is an additional object of the invention to provide a novel method of increasing luteal secretion in warm-blooded animals by stimulation of LH secretion.

It is a further object of the invention to provide a novel method of decreasing LH secretion in male and female warm-blooded animals.

These and other objects and advantages of the invention will become obvious from the following detailed description.

THE INVENTION

The novel product of the invention is 17α-methyl-19-nor-$\Delta^{4,9}$-pregnadiene-3,20-dione and is especially valuable because of its important progestative activity, particularly when taken orally.

At low doses, the said product stimulates LH secretion in warm blooded animals and thereby increases luteal secreation. This makes it useful for the treatment of amenorrhea, of hypermenorrhea, metrorrhagia, menorrhagia, sterility, abortion, all of the hyperfolliculinic manifestations, of nervous and psychic symptoms connected therewith, and of hypogalactic manifestations, and for the treatment in a general fashion of all of the disorders connected with a luteinic insufficiency. At higher doses of the said product, the secretion of LH in male and female warmblooded animals is decreased. The product exhibits an anti-androgenic activity in male warm-blooded animals and is useful for the treatment of acne ro calvity or hyperandrogenic manifestations in the adult.

The process of the invention for the production of 17α-methyl-19-nor-$\Delta^{4,9}$-pregnadiene-3,20-dione comprises reacting a 3-lower alkoxy-19-nor-$\Delta^{1,3,5(10),16}$-pregnatetraene-20-one with a methylating agent such as methyl iodide to form 3-lower alkoxy-17α-methyl-19-nor$\Delta^{1,3,5(10)}$-pregnatriene-20-one, reducing the latter with an alkali metal in ammonia to form 3-lower alkoxy-17α-methyl-19-nor-$\Delta^{2,5(10)}$-pregnadiene-20-ol, subjecting the latter to acid hydrolysis to form 17α-methyl-19-nor-$\Delta^{5(10)}$-pregnene-20-ol-3-one, oxidizing the latter to form 17α-methyl-19-nor-$\Delta^{5(10)}$-pregnene-3,20-dione and brominating and dehydrobrominating the latter to form 17α-methyl-19-nor-$\Delta^{4,9}$-pregnadiene-3,20-dione.

The novel therapeutic compositions of the invention are comprised of an effective amount, preferably 2 to 50 mg. for the adult, of 17α-methyl-19-nor-$\Delta^{4,9}$-pregnadiene-3,20-dione and a major amount of a pharmaceutical carrier. The compositions may be prepared in the form of injectable solutions or suspensions put up in ampoules or multiple dose flacons, and in the form of tablets, coated tablets, sublingual tablets, gelatine tablets, emulsions and suppositories prepared in the usual manner.

The method of the invention for the treatment of disorders in warm-blooded animals due to insufficient corpus luteum secretion comprises administering to a warm-blooded animal an effective amount of 17α-methyl-19-nor-$\Delta^{4,9}$-pregnadiene-3,20-dione. The said product may be administered orally, rectally, transcutaneously or perlingually. The usual useful dosage is 0.03 to 0.3 mg./kg. depending on the method of administration and the desired result.

In the following examples there are described several preferred embodiments to illustrate the invention. However, it should be understood that the invention is not intended to be limited to the specific embodiments.

EXAMPLE I

Preparation of 17α-methyl-19-nor-$\Delta^{4,9}$-pregnadiene-3,20-dione

Step A.—3 - methoxy - 17α - methyl - 19-nor-$\Delta^{1,3,5(10)}$-pregnatriene-20-one: Under agitation and an inert atmosphere, 1.150 g. of lithium were introduced into 1 liter of ammonia cooled to a temperature of −70° C. For 15 minutes this reaction mixture was agitated, then, while maintaining the temperature at about −75° C., 1 liter of ether was added thereto, followed by 20 gm. of 3-methoxy-19-nor-$\Delta^{1,3,5(10),16}$-pregnatetraene - 20 - one. The mixture was allowed to stand for 2 hours at a temperature of −75° C. under continued agitation and under continued inert atmosphere. Next, 160 cc. of methyl iodide were added and the reaction mixture was again agitated for 2 hours at −75° C.

Thereafter, the ammonia was evaporated, 1 liter of water was added thereto and the aqueous phase was separated and extracted with ether. The ethereal phases now combined were washed with water until the wash waters were neutral, then dried over sodium sulfate, filtered and distilled to dryness to obtain 21 gm. of product, which was dissolved in 210 cc. of ethanol under reflux. Next, 21 cc. of acetic acid and 21 gm. of Girard's reactant T were added thereto. The mixture was agitated for 1½ hours under an atmosphere of nitrogen while maintaining the reflux. Thereafter, the reaction mixture was cooled to room temperature and then poured into 1050 cc. of water. Next, 155 cc. of 2 N sodium hydroxide solution were added and finally the mixture was extracted with ether. The combined ethereal phases were washed with water until the wash waters were neutral, dried over sodium sulfate, filtered and evaporated to dryness to obtain 16.80 gm. of raw product which was purified by redissolving the product obtained in acetone under reflux and by recrystallization by heating and cooling.

13.185 gm. of 3-methoxy-17α-methyl-19-nor Δ$^{1,3,5(10)}$-pregnatriene-20-one were thus obtained in the form of a colorless, solid product. The product was easily soluble in ether, soluble in alcohol, benzene and chloroform and insoluble in water. This product had a melting point of 109° C. and a specific rotation of $\alpha_D^{20} = +75° \pm 1°$ (c.=0.5% in chloroform).

*Analysis.*—Calculated for $C_{22}H_{30}O_2$ (percent): C, 80.93%; H, 9.26. Found (percent): C, 80.9; H, 9.3. Molecular weight=326.46.

ULTRA-VIOLET SPECTRA

| | | |
|---|---|---|
| Inflection toward | 229 mμ | $E_{1cm.}^{1\%} = 211$ |
| Inflection toward | 273 mμ | $E_{1cm.}^{1\%} = 47.6$ |
| λ max. at | 278 mμ | $E_{1cm.}^{1\%} = 62.6$ |
| λ max. at | 287 mμ | $E_{1cm.}^{1\%} = 58.2$ |

This product is not described in the literature.

The starting compound, 3-methoxy-19-nor-Δ$^{1,3,5(10),16}$-pregnatetraene-20-one, was obtained according to the process decribed by Burn, J. Chem. Soc. 1962, p. 364.

Step B.—3 - methoxy - 17α - methyl - 19 - norΔ$^{2,5(10)}$-pregnadiene 20-ol: 500 cc. of ammonia and a solution of 20 gm. of 3-methoxy-17α-methyl-19-nor-Δ$^{1,3,5(10)}$-pregnatriene-20-one were admixed with 400 cc. of tetrahydrofuran, and 10 cc. of ethanol were added thereto. The interior temperature was lowered to about —35° C. Then 2.150 gm. of lithium were added under an inert atmosphere and the reaction mixture was agitated for 15 minutes, after which 10 cc. of ethanol and again 2.150 gm. of lithium were added. After agitating the mixture for a further 15 minutes, another 30 cc. of ethanol, then 2.150 gm. of lithium were added. After maintaining the reaction mixture at —35° C. for 30 minutes, 30 cc. of ethanol were added thereto. The ammonia was evaporated by bringing the temperature back to +20° C. 500 cc. of water were added and the mixture was extracted with ether. The aqueous phase was discarded after having been extracted with ether. The combined ethereal phases were washed with water, dried over sodium sulfate, filtered and distilled to dryness, to obtain 20.240 gm. of 3-methoxy-17α - methyl - 19 - nor Δ$^{2,5(10)}$-pregnadiene-20-ol, which product was utilized as such for the next step. The compound occurred in the form of an amorphous product which was soluble in alcohol, ether, benzene and acetone and insoluble in water.

This product is not described in the literature.

Step C.—17α - methyl - 19 - nor - Δ$^{5(10)}$-pregnene-20-ol-3-one: 20 gm. of the compound prepared in Step B were dissolved in 35 cc. of acetone, while agitating the solution for 15 minutes at room temperature. Thereafter, 300 cc. of acetic acid containing 25% of water were added to the reaction mixture, which was then agitated for 3 hours and thereafter poured into a water-ether mixture and agitated for 10 minutes. The aqueous phase was separated after extracting with ether. The ethereal phases were washed first with an aqueous solution of sodium bicarbonate, then with water, dried over sodium sulfate, filtered and distilled to dryness to obtain 19.140 gm. of 17α-methyl-19-nor-Δ$^{5(10)}$-pregnene-20-ol-3-one. This product was utilized as such for the following step. The said compound occurred in the form of a colorless, amorphous product which was soluble in alcohol, ether, benzene, acetone and chloroform and insoluble in water.

This compound is not described in the literature.

Step. D.—17α - methyl - 19 - nor - Δ$^{5(10)}$-pregnene-3 20-dione: 20.5 gm. of the compound prepared in Step C were dissolved in 615 cc. of acetone under an atmosphere of nitrogen and under agitation. The solution obtained was cooled to —20° C. Next 21 cc. of a solution of 54 gm. of chromic acid anhydride and 46 cc. of dilute sulfuric acid were added thereto. The solution was allowed to stand for 1 hour under agitation at about —10° C. It was then poured into 2 liters of a mixture of ice and water and extracted with benzene. The combined organic phases were washed first with water, then with a saturated solution of sodium bicarbonate and again with water. Next, these phases were dried over magnesium sulfate and distilled to dryness.

20.40 gm. of crude product were thus obtained, which was purified by subjecting it to chromatography through magnesium silicate and elution with benzene containing 2.5% of acetone, and recrystallization from isopropyl ether to obtain 8.50 gm. of 17α-methyl-19-nor-Δ$^{5(10)}$-pregnene-3,20-dione in the form of a colorless crystallized product. The said product was soluble in alcohol, ether, acetone, benzene and chloroform and insoluble in water. This product had a melting point of 138° C., and a specific rotation of $\alpha_D^{20} = +168.5° \pm 3.5°$ (c.=0.50% in chloroform).

*Analysis.*—Calculated for $C_{21}H_{20}O_2$ (percent): C, 80.20; H, 9.61. Found (percent): C, 80.5; H, 9.6. Molecular weight=314.45.

This product is not described in the literature.

Step E.—17α-methyl - 19 - nor-Δ$^{4,9}$-pregnadiene-3,20-dione: Under agitation and an atmosphere of nitrogen, 8.50 gm. of the compound prepared in Step D were dissolved in 85 cc. of pyridine and cooled to 0° C. next, 16.3 cc. of a 29%-bromine solution in methanol were added thereto. The agitation was continued for 30 minutes at the temperature of 0° C. Thereafter the temperature was raised to room temperature and the solution was allowed to stand for 16 hours under agitation The solution was then poured into 850 cc. of a mixture of ice and water and after 82 cc. of hydrochloric acid were added, the mixture was extracted with methylene chloride. The combined organic phases were washed with water until the wash waters were neutral, then dried over magnesium sulfate and finally distilled to dryness to obtain 8.480 gm. of a crude product which was purified by recrystallidation from isopropyl ether. In this manner, 5.810 gm. of 17α-methyl-19-nor-Δ$^{4,9}$-pregnadiene-3,20-dione having a melting point of 106° C. and a specific rotation $[\alpha]_D^{20} = -270° \pm 4.5°$ (c.=0.5% in ethanol) were obtained.

*Analysis.*—Calculated for $C_{21}H_{28}O_2$ (percent): C; 80.72; H, 9.03. Found (percent): C, 80.6; H, 8.9. Molecular weight=312.43.

ULTRAVIOLET SPECTRA (ETHANOL)

| | | |
|---|---|---|
| τ max. at | 315 mμ | $E_{1cm.}^{1\%} = 203$ |
| Inflection toward | 235 mμ | $E_{1cm.}^{1\%} = 157$ |
| λ max. at | 302 mμ | $\epsilon = 20,800$ |

This product is not described in the literature.

EXAMPLE II

Preparation of 17α-methyl-19-nor-Δ$^{4,9}$-pregnadiene 3,20-dione 10 g. of 17α-methyl-19-nor-Δ$^{5(10)}$-pregnene-3,20-dione were dissolved in 60 cc. of pyridine under an inert atmosphere. After cooling to —10° C., 12 g. of pyridinium perbromide were added in small portions and then the reaction mixture was stirred for 45 minutes at —10° C., then the temperature was allowed to rise again to 20–25° C. and stirred for 20 hours in darkness. The reaction mixture was poured into a mixture which consisted of 600 cc. of water and ice and 300 cc. of hydrochloric acid. The mixture was extracted with methylene chloride and the organic phases were washed with a sodium bicarbonate solution, then with water, dried over magnesium sulfate and distilled to dryness. The crystalline residue was chromatographed on magnesium silicate and eluted with methylene chloride. By concentration of the eluates and precipitation with isopropyl ether, 7.15 g. of 17α-methyl-19-nor-Δ$^{4,9}$-pregnadiene-3,20-dione with a melting point of 103 to 104° C. and specific rotation $[\alpha]_D^{20} = -283°$ (0.5% in ethanol) were obtained. The product was soluble in alcohols, acetone, benzene, chloroform and insoluble in water.

Analysis.—Calculated for $C_{21}H_{28}O_2$ (percent): C, 80.72; H, 9.3. Found (percent): C, 80.80; H, 8.0. Molecular weight=312.43.

EXAMPLE III

Tablets containing 10 mg. of
17α-methyl-19-nor-Δ$^{4,9}$-pregnadiene-3,20-dione 10 gm. of 17α-methyl-19-nor-Δ$^{4,9}$-pregnadiene-3,20-dione, 4.655 gm. of white sugar, 30.590 gm. of potato starch and 4.655 gm. of lactose were admixed to form a homogenous mixture to which was added a sufficient amount of an aqueous solution of gelatine to obtain a granulated mixture. The resulting granulate was spread out on a plate in a thin layer and dried in an aired oven at 50° C. The dried granulate was broken into small pieces and passed through a sieve of appropriate size and then was admixed with 10 gm. of talc and 2 gm. of magnesium stearate for lubrication. The granulated powdered substance was then pressed into tablets weighing 0.155 gm. and containing 10 mg. of 17α-methyl-19-nor-Δ$^{4,9}$-pregnadiene-3,20-dione. The average weight tolerance of 10 tablet dose was ±5% of the theoretical weight.

EXAMPLE IV

Injectable suspension containing 2%
17α-methyl-19-nor-Δ$^{4,9}$-pregnadiene-3,20-dione 1,000 gm. of 17α-methyl-19-nor-Δ$^{4,9}$-pregnadiene-3,20-dione was suspended in 13,400 cc. of an aqueous solution of 250 gm. benzyl alcohol and heated to 100° C. to sterilize the said product and then it was pulverized to micro-sized particles in the aqueous medium under aseptic conditions. To the said concentrated suspension, there were added under aseptic conditions 15,000 cm.³ of an aqueous solution containing 18 parts per 1000 of sodium chloride, previously sterilized at 120° C. (to make solution isotonic), 200 gm. of sterilized benzyl alcohol, (bacterostatic preservation) 200 gm. of polysorbate 80, (non-ionic surface active agent), and a sufficient amount of an aqueous solution of 0.5 percent of sodium carboxymethylcellulose sterilized at 120° (viscosity agent), to adjust to 50 liters so as to obtain a suspension containing 2% of the active principle.

The suspension, which was kept homogenous by agitation, could be distributed under aseptic conditions into 1 cc. to 20 cc. ampoules or flacons. Injection suspensions containing between 0.5 to 20% of 17α-methyl-19-nor-Δ$^{4,9}$-pregnadiene-3,20-dione can be prepared.

EXAMPLE V

Suppositories containing 10 mg. of 17α-methyl-19-nor-Δ$^{4,9}$-pregnadiene-3,20-dione 0.100 kg. of 17α-methyl-19-nor-Δ$^{4,9}$-pregnadiene-3,20-dione and 0.800 kg. of lactose were admixed by successive additions thereof to a small mixer and the resulting mixture was passed through a 60-mesh screen of stainless steel. Into a double lined container equipped with a stirring device, there was introduced first 19.230 kg. of melted cocoa butter at 50° C. which was allowed to cool to 35 to 40° C. after which it was agitated while 0.020 kg. of α-tocopherol was added thereto. The original container of α-tocopherol was rinsed out with a small quantity of melted cocoa butter which was added to the covered container. Then the mixture of lactose and the active compound was added therto in small fractions with agitation. The container, also provided with an airtight cover, was recovered and a light stream of nitrogen was introduced into the container. A stream of ice water was passed through the double liner until the batch had a tacky consistency, at about a temperature for the mixture of 25° C. and then the mixture was slightly reheated (30 to 32° C.), by passing steam through the double liner to obtain a sufficiently liquid consistency for pouring. Agitation was continued during the entire procedure. The mixture was poured through a lateral opening into small cavities held in place by a metal frame while maintaining the liquid consistency temperature. After several minutes, the mixture solidified in the cavities and the cavities were smoothed off with a scraper. Then the cavities were placed in a refrigerator at −10° C. to complete the solidification. The frame-supported cavities were then removed from the refrigerator and emptied to obtain 10,000 suppositories having a final weight of 2 gm. and containing 10 mg. of 17α-methyl-19-nor-Δ$^{4,9}$-pregnadiene-3,20-dione.

EXAMPLE VI

Injectable solution containing 10 mg. per cc. of
17α-methyl-19-nor-Δ$^{4,9}$-pregnadiene-3,20-dione 0.500 l. of benzyl alcohol were heated to approximately 45–50° C. and then after 100 gm. of 17α-methyl-19-nor-Δ$^{4,9}$-pregnadiene-3,20-dione were added thereto, the heating was continued until complete dissolution of the mixture was obtained. Thereafter, 7 liters of neutral olive oil were added in successive fractions under agitation and followed by the addition of 0.300 l. of absolute alcohol. The solution was then agitated until a homogeneous solute was obtained. This solute was filtered through a filter lined with a stiff paper previously rinsed in oil. After the filtration, the filter was again rinsed with 0.500 l. of olive oil, and the filtrate was agitated until a homogeneous solution was obtained. Thereafter, the volume was increased to 10 liters by the addition of olive oil. The solution was put up in ampoules of 1 cc. which were sterilized in an autoclave according to the usual methods.

PHARMACOLOGICAL STUDY

Determination of the progestomimetic activity (A) Oral administration.—The progestomimetic activity of 17α-methyl-19-nor-Δ$^{4,9}$-pregnadiene-3,20-dione was determined by the Clauberg test conducted on immature rabbits, which had been previously sensitized by subcutaneous administration of estradiol benzoate over a period of 5 days with a daily dose of 10 μg. The said product was utilized as a solution in olive oil admixed with 5% of benzylic alcohol and was orally administered for 5 days at doses of 5γ, 10γ and 20γ per day. The animals were sacrificed on the 6th day and the jagged proliferation of the endometritis on sections of the uterus which is characteristic of the progestomimetic action was noted.

For comparative purposes, 6α-chloro-17α-acetoxy-Δ$^{4,6}$-pregnadiene-3,20-dione was administered in the same solvent and at identical doses. The results of the tests expressed in MacPhail units, are summarized in Table I.

TABLE I

| Products given orally, daily dose in γ | MacPhail units | | |
|---|---|---|---|
| | 5 | 10 | 20 |
| 17α-methyl-19-nor-Δ$^{4,9}$-pregnadiene-3,20-dione | 0.4 | 2.0 | 2.6 |
| 6α-chloro-17α-acetoxy-Δ$^{4,6}$-pregnadiene-3,20-dione | 1.6 | 2.0 | 2.0 |

Table I shows that 17α-methyl-19-nor-Δ$^{4,9}$-pregnadiene-3,20-dione, when orally administered, has a progestomimetic activity approximately equal to that of 6α-chloro-17α-acetoxy-Δ$^{4,6}$-pregnadiene-3,20-dione.

(B) Subcutaneous administration.—The test was performed under the same experimental conditions as in Test A except that the products were subcutaneously administered. The product of the invention and 6α-chloro-17α-acetoxy-$\Delta^{4,6}$-pregnadiene-3,20-dione were administered as solutions in olive oil admixed with 5% of benzylic alcohol at doses of 1.56γ, 3.12γ and 6.25γ per day. The results are summarized in Table II and are expressed in MacPhail units.

TABLE II

| Products given subcutaneously, daily doses in γ | MacPhail units | | |
|---|---|---|---|
| | 1.56 | 3.12 | 6.25 |
| 17α-methyl-19-nor-$\Delta^{4,9}$-pregnadiene-3,20-dione | 0.7 | 2 | 2.5 |
| 6α-chloro-17α-acetoxy-$\Delta^{4,6}$-pregnadiene-3,20-dione | 1.0 | 2.4 | 2.4 |

Table II shows that 17α-methyl-19-nor-$\Delta^{4,9}$-pregnadiene-3,20-dione, when subcutaneously administered, has a progestomimetic activity about equal to that of 6α-chloro-17α-acetoxy-$\Delta^{4,6}$-pregnadiene-3,20-dione at a dose of 3.12γ per day.

(C) Test for maintaining gestation.—This test was based on the fact that abortion, which is customary with rabbits subjected to ovariectomy during gestation, could be prevented by an appropriate treatment replacing the ovarian hormones. Rabbits, castrated on the 14th day of their gestation, were treated daily from the 13th to the 27th day by subcutaneous administration of 17α-methyl-19-nor-$\Delta^{4,9}$-pregnadiene-3,20-dione as a solution in olive oil admixed with 5% of benzylic alcohol. The animals were sacrificed on the 28th day. The fetuses were removed, counted, measured and weighed. The number of fetuses carried by each rabbit was estimated as well as, in the present case, the number of macerated placentas present. The latter corresponded to abortions.

17α-methyl-19-nor-$\Delta^{4,9}$-pregnadiene - 3,20 - dione was administered subcutaneously at daily doses of 0.0125 mg., 0.025 mg. and 0.050 mg. respectively per group of rabbits. As a comparison, three lots of rabbits were castrated after becoming pregnant under the same conditions and treated respectively with daily doses of 0.025 mg., 0.050 mg. and 0.100 mg. of 6α-chloro-17α-acetoxy-$\Delta^{4,6}$-pregnadiene-3,20-dione administered subcutaneously in the same solvent.

Whereas the dose of 0.025 mg. of 6α-chloro-17α-acetoxy-$\Delta^{4,6}$-pregnadiene-3,20-dione did not prevent a total abortion, the identical dose of 17α-methyl-19-nor-$\Delta^{4,9}$-pregnadiene-3,20-dione maintained gestation for the rabbits in 50% of the cases. Therefore, 17α-methyl-19-nor-$\Delta^{4,9}$-pregnadiene-3,20-dione manifested a true gestative action starting with the dose of 0.025 mg. per day.

(D) Anti-gonadotrophic activity.—The anti-gonadotrophic activity was determined on groups of mature male rats about 3 months old using the procedure of McGinty et al. (Methods in Hormone Research, vol. II (1962) p. 228). The rats received the product of the invention subcutaneously daily for two weeks after which the animals were killed and the organs of the following Table III examined.

TABLE III

| Dose | Hypophysis, mg. | Testicles, g. | Seminal vesicles, mg. | Prostate, mg. | Surrenals mg |
|---|---|---|---|---|---|
| Controls | 7.1 | 2.65 | 422.7 | 272.4 | 34.4 |
| 0.5 mg | 7.3 | 2.54 | 196.2 (−54%) | 183.1 (−33%) | 37.0 |
| 5.0 mg | 8.1 | 2.26 (−15%) | 68.0 (−84%) | 107.3 (−61%) | 46.1 |

The results of Table III show that 17α-methyl-19-nor-$\Delta^{4,9}$-pregnadiene-3,2-dione shows a very definite anti-LH activity at a dose of 0.5 mg. At 5.0 mg., the said product shows very strong hypophysical inhibiting activity and the weight of the testicles is decreased while the weight of the hypophysis is slightly increased (castration effect).

(E) Anti-androgenic activity.—The anti-androgenic activity of the product was determined by the procedure of Dorfman (Methods in Hormone Research, vol. II, 1962). The product was administered subcutaneously daily to castrated immature male rats with and without testosterone propionate (50 μg./daily) for 7 days. The results are reported in Table IV.

TABLE IV

| | Levator ani, mg. | Seminal vesicles, mg. | Prostate, mg. |
|---|---|---|---|
| Controls | 20.8 | 8.7 | 18.5 |
| Testosterone propionate 50μg | 34.2 | 67.5 | 111.1 |
| 17α-methyl-19-nor-$\Delta^{4,9}$-pregnadiene-3,20-dione 1000μg | 24.3 | 9.4 | 15.5 |
| 1,000 μg of 17α-methyl-19-nor-$\Delta^{4,9}$-pregnadiene-3,20-dione plus 50μg. of testosterone propionate | 31.7 | 47.9 (−28%) | 89.0 (−20%) |

Table IV shows that the product of the invention does not possess any androgenic activity of its own even at a dosage of 20 times that of testosterone propionate and slightly reduces the activity of testosterone proprionate when used in a weight ratio of 20:1.

Various modications of the compositions and method of the invention may be made without departing from the spirit or scope thereof.

We claim:
1. 17α-methyl-19-nor-$\Delta^{4,9}$-pregnadiene-3,20-dione.
2. A process for the preparation of the compound of claim 1 which comprises reacting a 3-lower alkoxy-19-nor-$\Delta^{1,3,5(10),16}$-pregnatetraene-20-one with a methyl halide to form 3-lower alkoxy-17α-methyl-19-nor-$\Delta^{1,3,5(10)}$-pregnatriene-20-one, reducing the latter with an alkali metal in ammonia to form 3-lower alkoxy-17α-methyl-19-nor-$\Delta^{2,5(10)}$-pregnadiene-20-ol, subjecting the latter to acid hydrolysis to form 17α-methyl-19-nor-$\Delta^{5(10)}$-pregnene-20-ol-3-one, oxidizing the latter to form 17α-methyl-19-nor-$\Delta^{5(10)}$-pregnene-3,20-dione and brominating and dehydrobrominating the latter to form 17α-methyl-19-nor-$\Delta^{4,9}$-pregnadiene-3,20-dione.

References Cited

UNITED STATES PATENTS

| 2,860,148 | 11/1958 | Hershberg | 260—397.45 |
| 3,086,027 | 4/1963 | Perelman et al. | 260—397.3 |
| 3,346,454 | 10/1967 | Bucourt et al. | 167—74 |
| 3,361,744 | 1/1968 | Schaub et al. | 260—239.55 |

HENRY A. FRENCH, Primary Examiner

U.S. Cl. X.R.

260—397.4, 397.5; 424—242